Feb. 28, 1961  R. P. BAILLIE ET AL  2,972,775
APPARATUS FOR FORMING SHEET MATERIAL
Filed Aug. 26, 1954  4 Sheets-Sheet 1

INVENTORS.
Richard P. Baillie
William H. Smith
BY
THEIR ATTORNEYS

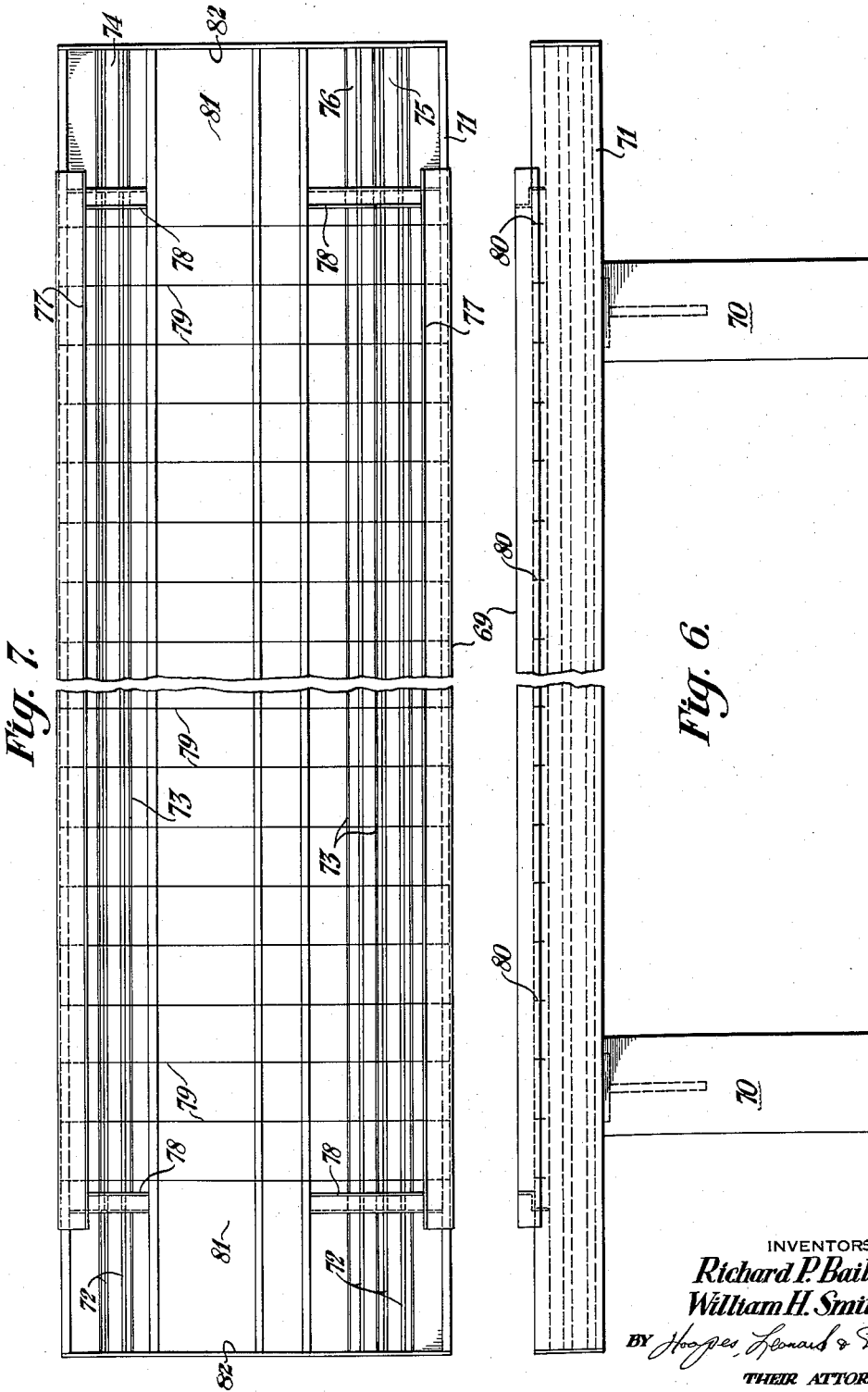

United States Patent Office 2,972,775
Patented Feb. 28, 1961

2,972,775

APPARATUS FOR FORMING SHEET MATERIAL

Richard P. Baillie, Forward Township, Butler County, and William H. Smith, Evansburg Borough, Pa., assignors, by mesne assignments, to Demmler and Schenck Company, Evans City, Pa., a corporation of Pennsylvania Filed Aug. 26, 1954, Ser. No. 452,322

4 Claims. (Cl. 18—19)

This invention relates to apparatus for forming sheet material. More particularly, it pertains to bending and shaping resinous sheet material.

Various resinous sheet materials which are generally formable have been available for some time. Many of the materials in question have been of a thermosetting nature while other which are also hard at room temperature have been of a thermoplastic nature. In the industry which manufactures, for example, kitchen and other cabinet tops using resinous sheet material such as, formable grades of "Formica" or "Micarta," some forming has been essayed. Thus, in one practice, backing members have been secured to resinous sheet material except along portions to be bent, which portion might be heated and bent around a mandrel. However, it was found that such bending was not always uniform and distortion would frequently occur, in some cases at least, by a stretching of the sheet material in a manner not readily duplicated with successive sheets. As a consequence, any wood base to be applied to such shaped sheet material might have to be altered or other custom work done to join the bent sheet material to such a base. In addition, there have in prior practices been relatively more extensive handlings of material and relatively greater numbers of operations to be performed resulting in lowered production or in production of lessened value and attractiveness.

In our new system, resinous sheet material of a formable nature which is hard at room temperature, whether thermosetting or thermoplastic, may quickly and readily be formed with exact reproduction in shape. Hence, the formed sheet material units are interchangeable, substantially resulting in the achievement of mass production techniques. In addition, the new machine means for forming the sheet material may be utilized for affixing a shaped base when such a base is to be applied to the formed sheet material. Still further, our new system includes a new heating device for differentially heating sheet material to be formed by our invention to accord with the amount of forming required in the respective forming areas of that sheet material. Means are also provided in our invention for insuring against relative surface movement of sheet material undergoing forming and against the occurrence of wrinkling or other unevenness.

Further objects and advantages of our invention will be apparent from the accompanying description and drawings, which are illustrative only, in which—

Figure 4 is a view of a retainer member subassembly mounted on the upper part of the new forming machine as shown in Figure 2;

Figure 5 is a view of the subassembly shown in Figure 4 taken along line V—V of Figure 4;

Figure 6 is a rear view of our new heating device shown to the left of the new forming machine in Figure 1 and taken along line VI—VI thereof;

Figure 7 is a plan view of that new heating device; and

Figure 3:
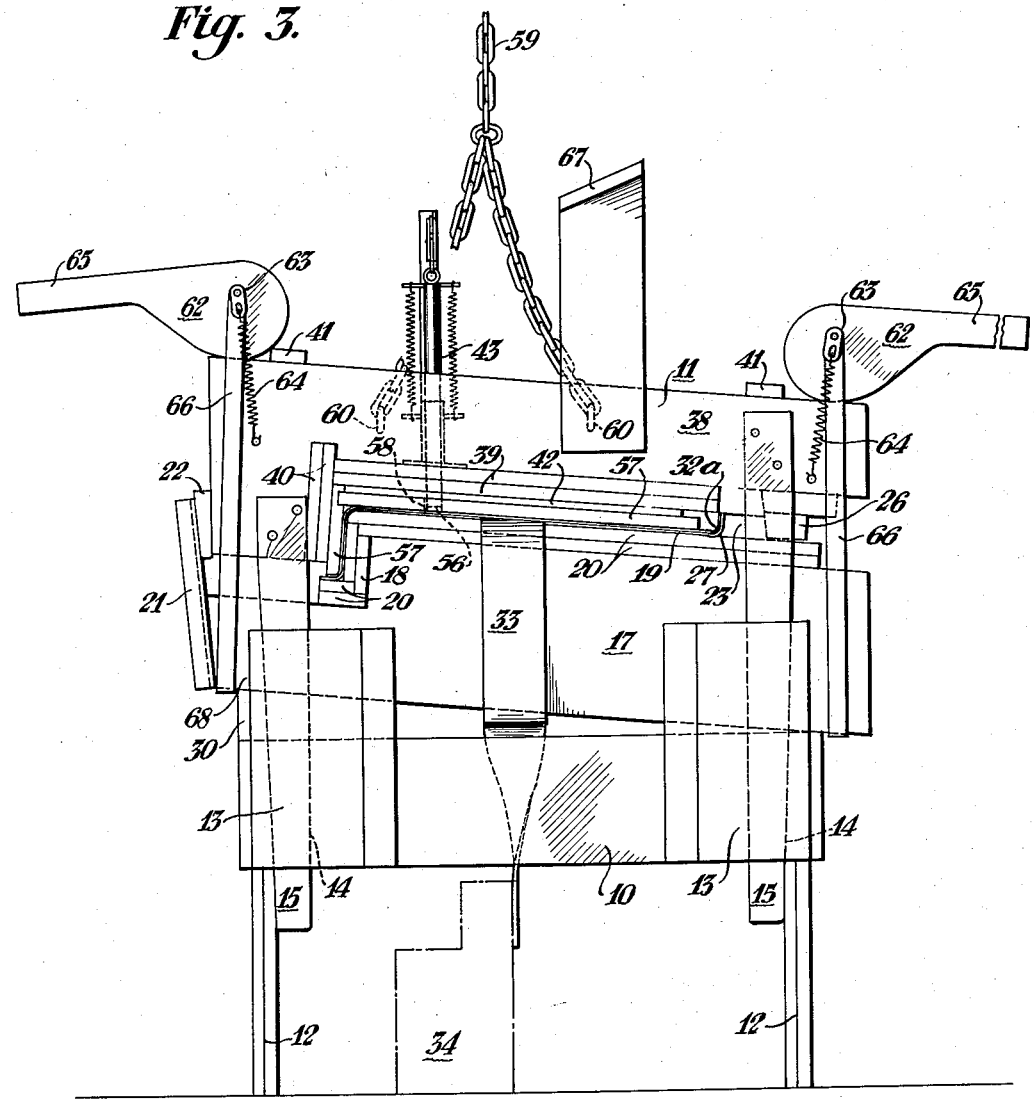
Figure 3 is an end view of the new forming machine shown in Figure 1 with its die members in closed position forming sheet material.
Figure 8:
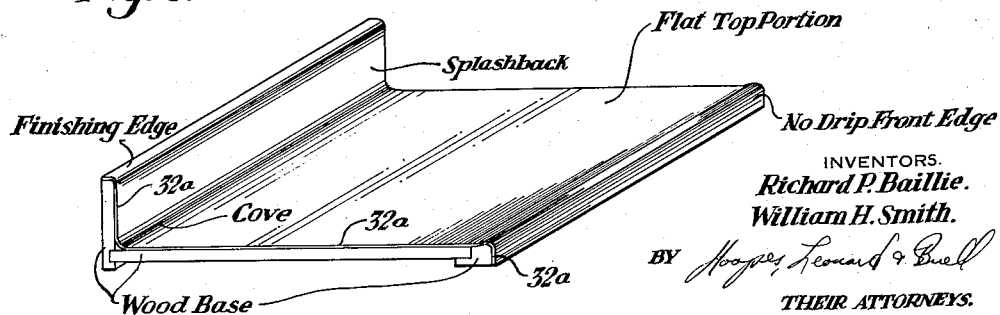
Figure 8 is a view of a cabinet or counter top having formed sheet material shaped by means of this invention and a base which has been affixed thereto in our new forming machine.

Referring to the drawings, our new forming machine may comprise a lower frame 10 and an upper frame 11 in superposed relation in the illustrated embodiment. In this description, the terms "upper" and "lower" are only to be deemed to be relative rather than absolute. Frame 10 may be provided with legs 12 and may have guide boxes 13 affixed at the corners thereof. Guide boxes 13 may be provided with vertically extending openings 14 therethrough for relative vertical movement guidance of downwardly extending posts 15 connected to the corners of upper frame 11. Posts 15 may be provided with holes 16 for the receipt of pins extending outwardly beyond the sides of the posts 15 to hold frames 10 and 11 in the relative open position shown in Figure 1 whenever operations are not being carried on. If desired, the posts 15 may be downwardly tapered in correspondence with a downwardly extending taper of registering holes 14 for precise positioning of the upper and lower frames 10 and 11 when the two are in closed position, as shown in Figure 3 of the drawings.

Figure 2:
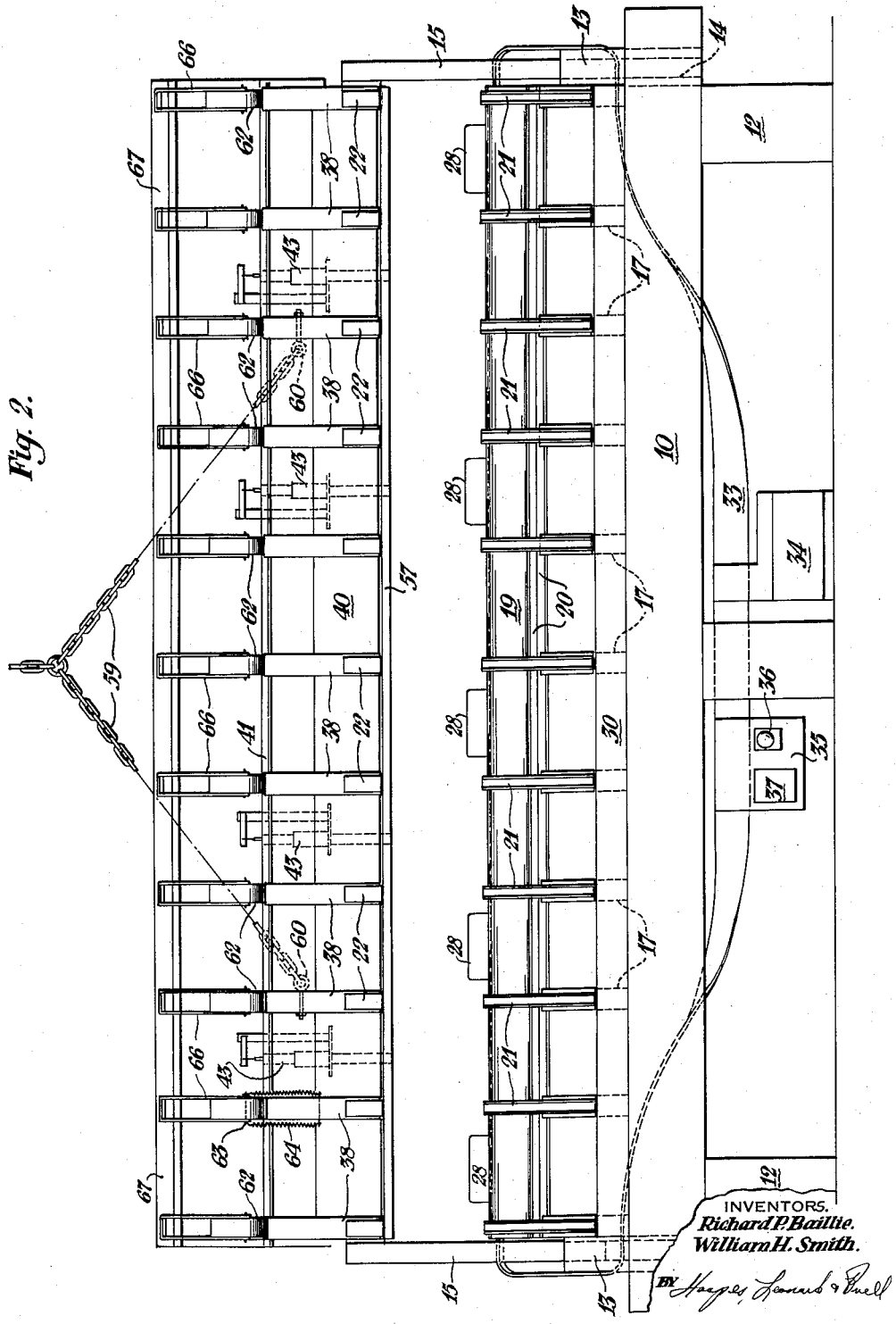
Figure 2 is a front view of our new forming machine shown in Figure 1 when looking in the direction of lines II—II.

Lower frame 10 is rigidly affixed to a plurality of beams 17 in spaced parallel relation from one end of the machine to the other, as shown in Figure 2. A shoulder 18 may be provided in each beam in registry with the corresponding shoulder in the other beams to form a recess to accommodate part of lower die 19 which is in the form of a continuous platen of metal such as stainless steel. Platen 19 may have sufficient electrical resistance to serve to heat the lower die if such should be desired. Die 19 is affixed to sheet supports 20 which extend across the tops of the respective beams 17. The sheet supports 20 are continued down the vertical side of the shoulder 18 and across the front of the reduced height of the beam in the recess formed by shoulder 18 a sufficient distance to underlie all of platen die 19. Platen die 19 may be affixed to supports 20 by screws having countersunk heads which sink into countersunk holes extending through die 19 so that the upper surface of die 19 is continuous and smooth. The supports 20 may be of an insulating material like wood. The forward ends of the beams 17 may be provided with channels 21, the inner surfaces of which incline outwardly and upwardly to engage the forward face of positioning wedges 22 affixed to the front of upper frame member 11.

Figure 1:
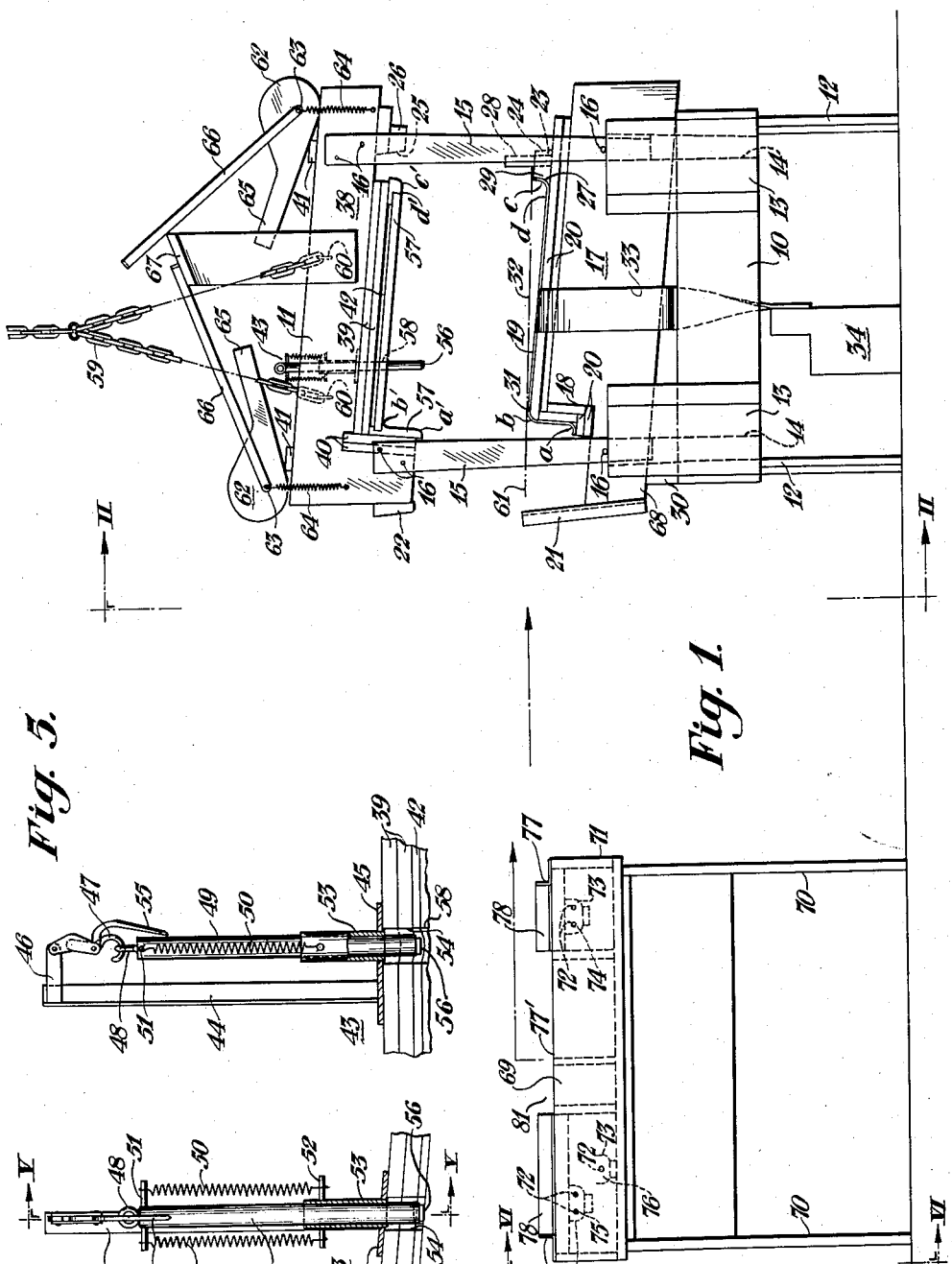
Figure 1 is an end view of our new heating device and forming machine combination.

In like manner, the mounting supports 20 may be provided with a wedge bar 23, the outer rearward face 24 of which is adapted to engage the forwardly facing face 25 of wedges 26 on the rear side of upper frame member 11. The forward face 27 of wedge bar 23 may be provided with an inside curve or cove to continue the full and uniform support of the underside of platen 19 as shown in Figures 1 and 3. A longitudinal spaced series of backing stops 28 is also affixed to the mounting supports 20 a selected distance in back of the rear edge 29 of platen 19. Edge 29 is at the height of the top of wedge bar 23. The beams 17 preferably are tipped upwardly and forwardly by a bar 30 so that the uppermost line element 31 of platen 19 is about on a level with edge 29. Hence, when a sheet of formable resinous sheet material 32 is positioned in our new forming machine, it will be stably supported along support contact line 31 and the top of bar 23. Ribbon conductors 33 may extend between the respective ends of platen 19 and the terminals on the output side of a transformer 34 which is regulated by a control 35 having a thermostat switch 36 and a magnetic switch 37 therein for whatever regulation is desired within the range of such control to effect any preselected temperature of die 19 as in the case, for example, when a temperature-setting adhesive may be used at a time a wood base is being affixed to formed sheet material shaped in our new forming machine.

Upper frame member 11 comprises a series of horizontally spaced beams 38 joined on the underside and covered by sheets 39 of a material like plywood. The forward ends of the beams 38 extend downwardly and are covered by sheets 40. The beams 38 are also connected by bars 41 at the front and rear ends thereof making a rigid frame structure. A filler board 42 is also affixed in the illustrated embodiment to the solid sheets 39.

In certain positions as shown in Figures 1 and 2, retainer subassemblies 43 may be provided. A standard 44 mounted on a base plate 45 and having an arm 46 for a toggle latch 47 permits latch 47 to engage an eye 48 whenever it is desired to maintain retainer rods 49 in retracted position, as shown in Figures 4 and 5, against the pull of springs 50. Springs 50 are connected between bars 51 affixed to retainers 49 at the upper ends thereof and to bars 52 at the lower ends of the springs 50. Bars 52 are welded, for example, to each guiding tube 53 which is also mounted on each base plate 45 above an opening 54. Hence, when handle 55 of the toggle latch 47 is raised to lower latch 47 and permits the retainers 49 to be unhooked, the springs 50 will move the retainers 49 into extended position, as shown in Figure 1 so that the tip of the retainers 49 will be below the upper die platen 57. Upper die platen 57 is provided with holes 58 in registry with openings 54 and the tip 56 of the retainers 49 may be made of rubber for friction gripping purposes if desired.

Movement up and down of frame member 11 may be provided through the medium of chains 59 fastened to eyes 60 at the lower ends of frame 11 and to a crane hook or chain hoist hook at the upper ends of those chains. Hence, upon the lowering of chain 59, frame 11 and thereby upper die 57 moves toward closing position relative to frame 10 and lower die 19 respectively. At the same time, the posts 15 will move downwardly in the openings 14 until the dies are closed forming sheet material 32, as shown in Figure 3, the precision registry and alignment being insured not only by posts 15 and openings 14 but also by the cooperating wedging surfaces on 21 and 22 and on 24 and 25.

Upper die platen 57 may be a wood base of the kind which may be used with sheet material formed by platens 19 and 57, the facing surfaces of platens 19 and 57 being generally parallel and complementary. Such a platen 57 is provided with openings 58 as described above and may also be fastened as by screws to the mounting sheets 39, 40 and 42 in which case the heads of the mounting screw will be flush with the die surface of the die platen 57. In the complementary dies 19 and 57, which are illustrated, all of the lines normal to the plane of the drawing paper, in Figures 1 and 3, are straight lines. It is obvious that some of those lines may also be bent or curved if forming is also desired in such a transverse direction. When sheet material 32 is positioned, as shown in Figure 1, with the rear edge thereof against the front face of back stops 28 and the design or color side facing platen 19, the closing of the dies will make a counter top suitable for a kitchen cabinet in which the top outside curved finishing edge of the splash back, the inside curved joint between the splash back and the flat top and the outside curved front edge are in the form of longitudinal bends extending along the length of the sheet material 32. Those bends leave such formed sheet material continuous so that no metal joining strips are required in the manner of prior practices. The inside curve between the top and the splash back is termed a "cove" corner. In the illustrated embodiment, the die portions marked $a$ and $a'$ will form the top finishing edge of the splash back which terminates with the front edge 61 of the sheet material 32. The die portions $b$ and $b'$ will form the cove between the splash back and flat top. The die portions $c$ and $c'$ will form the front edge or ledge of the counter top to be formed from sheet material 32. A depression $d$ and bulge $d'$ may be provided respectively in dies 19 and 57 to nest and shape a slight rise along the front edge of such a counter top to prevent dripping over that downwardly curved front edge when sheet material 32 is formed. Filler board 42 fills in the edged space between the outer edges of platen 57 on the side away from platen 19, such outer edges being used in a cabinet top, for example, for registry purposes with the walls of that cabinet. Thereby, the filler board 42 gives firm and uniform support across the entire adjoining surface of platen 57.

Upper frame member 11 is also provided on the end of each beam with a clamping rocker or cam 62 having an eccentrically positioned pivot 63 resiliently connected to the adjacent ends of its beam 38 by springs 64 extending upwardly on each side of each end of beam 38. A lever 65 is integral with each cam 62 to move the same into and out of clamping position. A U-shaped strap 66 is also pivoted about the pivot 63 of each cam 62. A rest bar 67 extending the length of upper frame member 11 provides a rest surface of the straps 66 when they are out of clamping engagement position relative to the outwardly extending ends 68 of the beams 17.

A new heating device 69 may be provided in our invention in juxtaposition to our new forming machine so that the two cooperate in the forming of resinous sheet material like sheet material 32. Heating device 69 may comprise a table having legs 70 and a trough 71 thereon. The trough 71 may be provided with electrical resistance heater rods 72 and reflectors 73. These heating rods are positioned in groups in trough 71 to effect differential heating of resinous sheet material in accordance with the formable nature thereof. For example, in the embodiment illustrated, a heater 74 is provided across the front side of device 69 with two heating rods 72 therein. A similar heater 75 is provided across the rear side of device 69. Adjacent and below heater 75 there is a heater 76 having but a single heater rod 72 therein. Thus, by appropriate selection of the number of resistance rods, their positioning in the trough and their spacing below the top edge 77' of trough 71, we are enabled to heat resinous sheet material with precision along the bending zones that will be effected in the forming of sheet material and to vary the amount of heat input into those zones in accordance with the respective needs thereof. For example, in forming a material like formable "Formica" the portions of a sheet of such material to be formed must be heated to a suitable temperature within a range which must not exceed a temperature higher than about 350° F. Moreover, an outside curve such as that formed by the die surfaces $a-a'$ and $c-c'$ requires, for proper forming without strain or distortion, more heating than an inside curve such as that formed by the die sections $b-b'$. Thus, by means of their differential heating with the lesser heater 76 positioned for the bending area which will be formed by the die sections $b-b'$, the same heating period for resinous sheet material on our new heating device 69 will provide the requisite quantity of heat for each of the bending areas needs of that sheet material. It will be evident that controls may readily be installed to indicate when the sheet material should be removed or discharged in a direction toward the new forming machine and positioned as shown at 32 in Figure 1 for a forming operation.

In indexing such sheet material in our new heating device 69, the inward upstanding flanges 77 of front and rear guide angles and upstanding flanges 78 of end guide angles provide indexing guidance for the edges of such sheet material. In a production operation, the sheet material utilized will come in a selected size of the commercially available formable resinous sheet material. The guide flanges 77 and 78 on device 69 will be correspondingly spaced and the heaters 74, 75 and 76 will be varied in position from front to back of device 69 and in elevation to achieve the precise position and quantity of heat desired for the forming of that sheet material. The top edge 77' of trough 71 is defined by a series of heat resistant wires 79 which extend through holes drilled at the base of the flanges 77 and are brought downwardly for anchoring at 80 on the front and back of the trough. The flanges 78 and angles used to provide those flanges at the ends of the trough 71 are interrupted in the space between heaters 74 and 76 to provide a gap 81 for the ready movement of sheet material on to and off of positioning wires 79, the ends 82 of trough 71 allowing for either manual or automatic handling of sheet material moved relative to heating device 69. Suitable means for heating the resistance rods 72, although not illustrated are provided as will readily be understood.

In operation, a sheet of resinous sheet material is placed on wires 79 in device 69 between the positioning flanges 77 and 78 for the requisite time to enable the respective heaters 74, 75 and 76 to heat their respective longitudinal bend zones within their relatively precise lateral limits as determined by the number of rods 72 and the positions thereof. Thereupon, sheet 32 is lifted out and passed over the front end of device 69 into the position shown in Figure 1 between the two front posts 15 with the edge opposite to edge 61 resting against the back stops 28. In this forming operation utilizing heating device 69, it is not necessary to heat platen 19 although platen 19 may be heated to some extent if desired to somewhat lengthen the period before sheet 32 loses its temperature in the respective bend zone areas. Upon positioning sheet 32, as shown in Figure 1, chain 59 is lowered bringing upper frame member 11 and the parts carried thereby down substantially into the position shown in Figure 3 with, however, the straps 66 in the rest position shown in Figure 1. Moreover, in the course of the descent of chain 59 and upper frame member 11, the retainers 49 are in extended position as shown in Figure 1. By that means, the tips 56 engage sheet 32 generally before any part of platen 57 touches sheet 32. Thereby, when portion a' of die 57 engages sheet 32, the surfaces of sheet 32 cannot be shifted relative to the die surfaces and its alignment of support along line 31 on platen 19. The precise alignment of the dies 19 and 57 is maintained not only by the posts 15 and holes 14 but also as described above by the cooperating wedges in channels 21 with surfaces 22 and by the cooperating wedge surfaces 24 and 25. With the dies 19 and 57 almost closed, straps 66 are swung downwardly so that the lower U-shaped ends thereof swing beneath the lowermost parts of the respective projecting ends 68, the sides of the straps 66 passing downwardly along each side of each of the beams 17 for that purpose. Thereupon, the levers 65 are rotated from the positions shown in Figure 1 to the positions shown in Figure 3 to raise the pivots 63 and clamp dies 19 and 57 together in final closed position with the sheet 32 between them, said sheet 32 conforming to all of the bends and curves of the two die parts 19 and 57 as described above. In such clamping, the upper and lower die members 57 and 19 are squeezed together and there is no pressure on the legs 12 requiring a massive foundation or frame for our new forming machine since there is no downward pressure beyond that exerted by gravity.

As soon as the sheet material 32 has set in its formed shape designated 32a, which it will do in a particular length of time compatible with its nature, the levers 65 are returned to the positions shown in Figure 1, the straps 66 are also returned to the Figure 1 position and chain 59 is elevated to lift upper frame member 11 and the parts carried thereby into the opened position shown in Figure 1. If by any circumstance there is any tendency for the newly formed sheet material to rise with the upper part of the new forming machine, the retainer rods 49 will overcome any such tendency since spring 50 regain control as platen 57 lifts. During the squeezing operation, the retainer rods 49 are substantially forced into retracted position against the force of springs 50, as shown in Figure 3.

It may be noted that the retainer rods 49 hold sheet 32 during the forming thereof in such a manner as to prevent material relative shifting between the surfaces of the sheet material 32 and the respective surfaces of the dies 19 and 57. The finish surface having the color or design on the top surface of the sheet material 32 having been placed downwardly facing die 19 in the illustrated embodiment, it is thereby not marred or scratched in any way. In addition, the position indexing of sheet material 32 is such that an action in the nature of a wiping action takes place about the contact line 31 in a manner suggestive of the closing of a book so that as the shaping of the sheet material 32 proceeds, it is "wiped" against die surface 19 beginning about at contact line 31 until the shaping closure of the dies 19 and 57 is complete. Moreover, the position indexing of sheet material 32 in our new machine is such that preferably the width of sheet material from edge 29 to the front side of the stops 28 and elsewhere is no more than sufficient to move all of the sheet material at final die closure into contact with die platen 19. By these new means of forming, any tendency that might otherwise be present to acquire "wrinkles" or "bumps" is prevented.

The new forming machine shown on the right-hand side of Figure 1 and in Figure 3 may also be utilized to affix a wood base to shaped sheet material. Thus, in making cabinet or counter tops, it is usual to utilize a relatively thin resinous sheet material which when formed by our new system will have, in the illustrated embodiment, the configuration impressed and set therein by the complementary mating faces of the upper and lower dies. In the case of sheet material 32a formed by dies 19 and 57, such a wood base preferably will conform precisely to the shape of upper die platen 57 except that such wood base will have no holes 58 therethrough nor will it be affixed to the support mount 39—40 and to filler board 42. In affixing such a wood base to such formed sheet material 32a, the formed sheet may be left resting on platen 19. The platen 57 should be removed from the new forming machine. A wood base for that formed sheet 32a may be inserted in the forming machine between the front posts 15 when the upper and lower frame members are in open position so that the wood base overlies sheet 32a in the same relative position that platen 57 occupied at die closure position. Preferably an adhesive is applied either to the surface of the wood base facing formed sheet 32a, or to the surface of sheet 32a facing the base, or to both such surfaces before the wood base is inserted in the machine. Thereupon, the wood base is placed against formed sheet 32a in the same relative position as that that had been occupied by platen 57, as shown in Figure 3, and with the ends of the base preferably flush with the ends of 32a. Thereupon, the new forming machine may be closed and platen 19 may be heated to a temperature and for a time which will cause such adhesive to set, binding the wood base to the formed sheet material 32a and completing a cabinet or counter top having both the newly formed sheet 32a and a wood base affixed thereto. In closing the new forming machine again to bond the wood base to the formed sheet material 32a, the filler board 42 will enter the recess on the bottom of the wood base and provide complete and uniform support during the adhesive curing and binding period. Thereafter, the new forming machine may be opened and the composite formed sheet 32a with its affixed wood base may be removed before a new cycle of operations is commenced. In such last-mentioned machine opening, the rods 49 will again act to push the new cabinet or counter top away from the upper frame 11 if there should be any tendency of the top to lift when frame 11 is opened by being moved away from frame member 10. Instead of wood, the base may be made of metal or various compositions.

Various modifications may be made in the details of our invention without departing from the spirit thereof or the scope of the appended claims.

We claim:

1. Apparatus for forming postformable sheet material, comprising, in combination, a forming machine having a lower frame member and an upper frame member, said frame members further being movable relative to one another to open and close said machine, upper and lower forming rigid unitary dies of similar cross section respectively connected to said frame members, said dies having parallel forming surfaces including an intermediate area portion substantially at right angles to the direction of relative vertical movement of said dies, said dies being apart the thickness of said sheet material when said dies are closed, said parallel forming surfaces being in continuous right angle arrangement from front to back and straight from side to side, retainer members mounted in said upper frame member and extending through said upper forming die on said upper frame member to press only against said sheet material, said upper forming die and said lower forming die having their complementary forming surfaces somewhat tilted in general parallelism with said intermediate area portion correspondingly tilted from the horizontal, said lower forming die having at least line contact with said sheet material placed thereon when said machine is open, means to move said retainer members below said upper forming die to engage and press yieldably against said sheet material toward said lower forming die as said machine is closed to prevent relative surface shifting between said sheet material and said respective dies, and means for closing said machine and said dies to form said sheet material in conformance with the parallel forming surfaces of said dies.

2. Apparatus for forming post-formable sheet material, comprising, in combination, a forming machine having a lower frame member and an upper frame member, spaced horizontal beam ends respectively connected to said frame members, said frame members further being movable relative to one another to open and close said machine, upper and lower forming dies respectively connected to said frame members, retainer members mounted in said upper frame member and extending through said upper forming die on said upper frame member to press only against said sheet material, said upper forming die and said lower forming die having their complementary forming surfaces in generally continuous step-shaped arrangement from front to back and straight from side to side in general parallelism to one another, the corresponding parts of said respective complementary forming surfaces of greatest area being generally horizontal, said lower forming die having at least line contact with said sheet material placed thereon when said machine is open, means to move said retainer members below said upper forming die to engage and press said sheet material against said lower forming die so as to prevent relative surface shifting between said sheet material and said respective dies, means for closing said machine and said dies to form said sheet material in conformance with the shape of said dies and generally about said line of contact, said last-mentioned means having pivoted clamping straps to squeeze said frame members together, and lever means to move the center about which said straps pivot to shorten the effective length of said straps in the course of such clamping action.

3. Apparatus for shaping post-formable sheet material adapted to cover a base, comprising in combination, upper and lower forming dies similar in cross section having generally parallel complementary die surfaces with a generally horizontal portion intermediate two vertical portions substantially at right angles thereto with generally smooth right-angle bends connecting said portions, said die surfaces being in the arrangement of a step from front to back and straight from side to side, means to move said dies generally vertically relative to each other, said dies surfaces further being slightly tilted positioning said generally horizontal portion at a small angle to a plane normal to the direction of relative movement of said dies, means for bringing said die surfaces together vertically into parallel closure relation to shape sheet material positioned therebetween, means effective during said closure to press said dies transversely to insure nesting closure of said vertical portions of said die surfaces, and means other than said dies but within the bounds thereof to press without penetrating said formable sheet material against one of said dies without shaping it to hold it against shifting in advance of said closure of said dies.

4. Apparatus for forming postformable sheet material, comprising, in combination, upper and lower forming dies, means to move said dies relative to one another to open them, said dies having generally horizontal and vertical respectively parallel forming surfaces, said horizontal forming surface being substantially at right angles to the direction of relative movement of said dies which are spaced apart the thickness of said sheet material when said dies are closed, said parallel forming surfaces being in a generally continuous right angle arrangement from front to back and straight from side to side, a plurality of spaced retainer members extending through said upper forming die to press only against said sheet material, said lower forming die being positioned to support said sheet material directly, means to gauge the position of an outside edge of said sheet material relative to said lower forming die, means to move said retainer members below said upper forming die to engage and press yieldably against said sheet material toward said lower forming die as said dies are closed and in advance of said closing to inhibit shifting between said sheet material and dies, means to close said dies to form said sheet material, and means to press said dies relatively transversely toward each other upon said closing.

References Cited in the file of this patent

UNITED STATES PATENTS

| Re. 23,171 | Borkland | Nov. 29, 1949 |
| 1,436,941 | Burckard | Nov. 28, 1922 |
| 1,668,349 | Baum | May 1, 1928 |
| 1,858,225 | Frederick | May 10, 1932 |
| 1,879,555 | Simmons | Sept. 27, 1932 |
| 1,904,268 | Bronson | Apr. 18, 1933 |
| 2,284,833 | Mirando et al. | June 2, 1942 |
| 2,338,685 | Dee | Jan. 4, 1944 |
| 2,433,643 | Beach et al. | Dec. 30, 1947 |
| 2,484,656 | Sikka et al. | Oct. 11, 1949 |
| 2,511,024 | Toulmin | June 13, 1950 |
| 2,648,370 | Beach | Aug. 11, 1953 |
| 2,666,951 | Grove et al. | Jan. 26, 1954 |
| 2,707,307 | Brumbach | May 3, 1955 |
| 2,744,850 | Schofield | May 8, 1956 |
| 2,762,079 | Morse | Sept. 11, 1956 |

FOREIGN PATENTS

| 569,340 | Great Britain | May 18, 1945 |

UNITED STATES PATENT OFFICE
CERTIFICATION OF CORRECTION

Patent No. 2,972,775                      February 28, 1961

Richard P. Baillie et al.

It is hereby certified that error appears in the above numbered patent requiring correction and that the said Letters Patent should read as corrected below.

Column 2, line 53, for "face" read -- faces --; line 62, for "longitudinal" read -- longitudinally --; column 4, line 53, after "of" insert -- such --; column 6, line 7, for "spring" read -- springs --; column 7, line 43, and column 8, line 3, for "post-formable", each occurrence, read -- postformable --; column 8, line 63, list of references cited, for "Toulmin" read -- Toulmin, Jr. --.

Signed and sealed this 8th day of August 1961.

(SEAL)
Attest:

ERNEST W. SWIDER                      DAVID L. LADD
Attesting Officer                      Commissioner of Patents